United States Patent [19]

Boutier

[11] Patent Number: 4,609,393
[45] Date of Patent: Sep. 2, 1986

[54] APPARATUS FOR THE PRODUCTION OF GLASS CONTAINERS OF THE BOTTLE AND FLASK TYPE HAVING A MEDIUM OR NARROW APERTURE, USING THE BLOW-BLOW OR PRESS-BLOW PROCESS

[75] Inventor: Pierre G. Boutier, Le Havre, France

[73] Assignee: Verreries de Graville, Le Havre (Seine-Maritime), France

[21] Appl. No.: 692,272

[22] Filed: Jan. 17, 1985

[30] Foreign Application Priority Data

Jan. 18, 1984 [FR] France ............... 84 00759

[51] Int. Cl.$^4$ .............................. C03B 9/36
[52] U.S. Cl. .................... 65/229; 65/240; 65/241; 65/267; 65/322
[58] Field of Search ............ 65/229, 240, 241, 267, 65/322, 167

[56] References Cited

U.S. PATENT DOCUMENTS

| | | | |
|---|---|---|---|
| 1,555,216 | 9/1925 | Kadow et al. | 65/229 |
| 1,979,211 | 10/1934 | Rowe | 65/229 |
| 2,402,234 | 6/1946 | Berthold . | |
| 2,508,890 | 5/1950 | Rowe . | |
| 3,171,732 | 3/1965 | Andersen | 65/229 |
| 3,281,228 | 10/1966 | Andersen | 65/167 |
| 3,314,775 | 4/1967 | Shetler et al. | 65/167 |

Primary Examiner—Robert Lindsay
Attorney, Agent, or Firm—Seidel, Gonda, Goldhammer & Abbott

[57] ABSTRACT

Apparatus for the production of bottle and flask type glass containers having a medium or narrow aperture using the blow-blow or press-blow process. The apparatus is characterized in that it includes a two-part bushing having a top part and a bottom part, a compression spring acting on the bushing, an auxiliary jack connected to the piston of a main jack, a movable end which with the main piston defines one of the main jack chambers. The invention is applicable primarily to the liquid packaging industry.

12 Claims, 3 Drawing Figures

APPARATUS FOR THE PRODUCTION OF GLASS CONTAINERS OF THE BOTTLE AND FLASK TYPE HAVING A MEDIUM OR NARROW APERTURE, USING THE BLOW-BLOW OR PRESS-BLOW PROCESS

This invention relates to apparatus for the production of glass containers of the bottle and flask type having an average or narrow aperture, using the blow-blow or press-blow process. The apparatus comprises blanking moulds and finishing moulds with single or multiple-paraison modular boxes, which receive control mechanisms disposed beneath the blanking moulds to control the punches. Each mechanism comprises at least one double-acting jack, the piston of which controls the pressing punch movement, a cooling circuit, and the fluid of which flows in the mechanism and in the punch, a drive fluid supply to control the jack.

An apparatus or glass machine of this kind forms part of the more general apparatus comprising a glass furnace which delivers gobs of a given weight or volume via chutes to a battery of moulding stations each formed by a first part or blanking station and a second part or finishing station.

The apparatus is a very large assembly which is maintained by renewing some of the parts without modification of the parts, which must remain compatible (in respect of size and operation) with the complete assembly.

In greater detail:

The furnace, of a considerable weight of the order of several hundred tonnes, is installed on a metal frame above the various moulding machines that it is required to feed.

At the furnace outlet there is a distributer which delivers gobs of glass in appropriate quantities to chutes associated with each station of the various moulding machines.

The moulding machines comprise a plurality of stations, each serving to make one or more containers from the gobs it receives.

Each station comprises a blanking unit receiving the gob to form a hollow blank (paraison) obtained either by air injection (the blow-blow process) or by the introduction of a mandrel or core or punch (the press-blow process).

The resulting blank or paraison is transferred to the finishing mould after the blanking mould has been opened. Transfer is by a transfer means bearing the paraison secured by the bottle ring. The blank is brought to its final shape in the finishing mould.

The blanking mould comprises a body cut into two or more parts. The body is open at the top and bottom and corresponds to the shape of the blank in the inverted position.

The bottom part of the mould body has the final shape of the ring and the blowing nozzle or mandrel enters via this aperture.

The top part of the mould is closed by a cover after the gob coming from the chute has fallen into the mould.

The blowing of the hollow blank in the blanking mould is the oldest method used, particularly when pressing by mandrel is impossible, i.e. in the case of large bottles.

The pressing of the blank by means of a mandrel is the most recent technique; this process is advantageous because it allows a very uniform blank to be obtained since the mandrel pierces the gob which has fallen into the mould and urges the glass against all the mould walls; the shape and the thickness of the blank therefore correspond to the mould precisely.

Blow-moulded blanks, on the other hand, are much less uniform, because the piercing of a cavity in the gob, the urging of the glass along the walls and against the end of the mould, are carried out by very uniform blowing without any surges, in order to avoid "rushing" the glass gob. The glass glob is not at a perfectly homogeneous temperature throughout its thickness since it has moulded or slid in the chute and has cooled very irregularly generally. The viscosity of the glass is therefore very different from one point of the gob to the other, and this results in unpredictably appreciably varying thicknesses. Since the thickness of the bottle made in the finishing mould corresponds to the thickness of the blank, the gob has to be over-dimensioned so that the smallest thickness of the bottle wall is sufficient to comply with the strength and other mechanical characteristics.

In bottles generally there is a thin peripheral zone resulting from the irregularity or uncontrollability of the thickness of the blank in the blow-blow process.

This problem has been solved in the manufacture of containers or flasks of small dimensions, because in that case it is possible to use the press-blow process. The reason for this is that the size possible for machines at the present time enables only small-travel mandrels to be embodied, and hence only small bottles can be pressed in the finishing mould, with a very uniform thickness without an appreciably reduced thickness peripheral zone. This enables very lightweight bottles to be produced, hence low-cost bottles.

Unfortunately, this process is not applicable at the present time to larger bottles.

The advantages would, however, be most effective for large bottles in order to reduce the cost of conventional bottles, allow competition with packaging in material other than glass, and obviate the pollution problems presented by the destruction of some materials, and increase the display and marketing characteristics of liquids thus bottled.

FIG. 1 shows a known apparatus comprising a glass furnace 1 connected to a feeder 2 delivering given quantities of molten glass via chutes 3 to different stations 4 of the actual glass machine 5. Machine 5 comprises boxes 6 containing the mechanisms and driving fluid supplies. Above the box are devices 7 formed by blanking and finishing moulds.

At the present time the glass machine stations can be stopped without the whole machine being stopped. However, for maintenance and dismantling the conventional mechanism outside its box in a station, the operation of the stations on either side must be stopped so as to give access to the fluid pipes required to be disconnected.

As regards efficiency, such stoppage results in considerable losses particularly since the machine operates continuously for 24 hours every day.

The object of this invention is to provide means whereby an existing flask or bottle manufacturing plant using the blow-blow process can be converted so as to manufacture bottles even in large sizes by the press-blow technique, more particularly for the manufacture of lightweight bottles, while retaining the possibility of working with either the blow-blow or press-blow process and without involving the glass machine in any appreciable modification, and enabling the mechanism to be installed in each box independently of adjacent boxes and without any need to stop the operation thereof.

To this end, the invention relates to an apparatus of the above type, characterised by:

(a) A two-part bushing (b) A top part adapted to project from the mechanism to enter into the ring mould and center the same (c) A bottom part retractable in the top part (d) A compression spring acting on the bushing to bring the bushing into the exit position (e) An auxiliary jack connected to the piston of the main jack to lift the latter by an adjustable length through the agency of a link acting in the auxiliary jack-main jack direction or vice-versa (f) A movable end defining with the main piston one of the chambers of the main jack, said movable end having an operative section smaller than that of the main piston, being fitted on the rod of the main piston beneath the bottom part of the bushing to be movable between a bottom position allowing the withdrawal movement of the punch adapter connected to the end of the rod of the main piston and the bushing beneath the surface of the mechanism, and a top position allowing the upward movement of the main piston and of the punch to carry out the pressing stroke.

An apparatus of this kind can be incorporated without difficulty in the modular boxes of existing or currently produced IS type glass machines. This can be done without any difficulty in replacing the conventional mechanisms. The incorporation requires no modification because its size, thanks to the means of the invention, corresponds to the space available. Generally, the mechanism according to the invention can be fitted to single-paraison glass machines, i.e. those in which each ladle produces a single container at a time, or alternatively multiple-paraison machines, i.e. those in which each ladle produces a plurality of containers each time. These multi-paraison ladles may have widely varying centers from $4\frac{1}{4}''$, $5''$, $5\frac{1}{2}''$, $6''$, $6\frac{1}{4}''$, etc. (It is conventional in glass making to use English measurements, i.e. inches) ($1''=25.4$ mm).

By means of the invention, the maximum stroke of the punch for the press-blow process is at least eight inches.

The mechanism according to the invention allows the use of different quick-change conventional cartridges currently used for the blow-blow process, irrespective of the cartridge manufacturer. The user of the apparatus can thus utilize the press-blow or blow-blow technique as he wishes.

With the means of the invention the spring acting on the bushing controls a lift which, in the current art, must be 23 mm.

For the range of containers manufactured in the case of centers equal to or greater than $5''$, the machine allows a second adjustable lift which in practice is between 0 and 27 mm, in addition to the lift provided by the spring. This second adjustable lift is controlled by the auxiliary jack independently of the main piston so that the complete stroke of the latter for pressing (eight inches at least) is fully retained. The embodiment of the mechanism as described above allows a very compact construction, providing cascade dismantling and complete overhaul in situ in the box without any need to stop sections on either side of the one under examination. This represents a very considerable saving in efficiency since only the mechanism concerned is stopped, the others continuing to operate. Consequently, the downtime is to some extent divided by a factor of 3, since only one station, and not three, has to be stopped. Also, thanks to its size, which requires no modification of the existing apparatus, the mechanism can be fitted as required to the stations without necessitating complete stoppage of the machine nor very heavy investment equivalent to appreciable modification of the machine and its installation.

According to another feature of the invention, to increase the punch travel and go from eight inches to nine inches, which is possible generally without having to modify the system for the distribution of the glass to the box, the top of the mechanisms simply have to be raised by wedges equivalent to this difference in travel, i.e. $1''$ (25.4 mm). Wedges of the same thickness are also disposed beneath the supports of the spindles of the blanking mould holders and finishing mould holders and beneath the transfer mechanism which transfers the blanks from the blanking moulds to the finishing moulds. Inside the actual mechanism all that is required is a wedge corresponding to this difference in height.

According to another feature of the invention, the link between the two parts of the bush to allow retraction of the bottom part with respect to the top part is provided by the auxiliary piston retaining the two parts in extension and allowing retraction of the bottom part in the top part.

Although the link between the two parts of the bushing may be made directly by a member which retains the two parts together in the normal position while enabling them to be moved apart for retraction of the lower part, it is preferable, according to the invention, to use the auxiliary jack piston in order to allow for the very small space available, such piston transmitting said movement to the punch through the bottom part of the bushing.

To provide the link, advantageously, the auxiliary piston bears a collar in the form of a half-shell engaging on a shoulder of the top part of the bushing and the bottom end of the outer arm of the auxiliary piston has a rim engaging beneath the top collar of the bottom part of the bushing.

With this arrangement engagement between the two parts of the bushing is possible by the piston while not complicating assembly and dismantling operations.

Advantageously, to avoid any relative rotation of the two bushings and provide at least partial continuity between the two bushings for guidance of the adapter, the two parts of the bushing terminate at their common part by crenellated edges overlapping one another and connecting the two parts of the bushing in respect of rotation.

According to another feature of the invention, the auxiliary jack is formed by an inner jacket and an outer jacket connected to one another to define an annular volume and the auxiliary piston is an inverted U-section piston straddling the inner jacket, the arm closing the auxiliary jack chamber with respect to the jacket inside the gap between the jackets and the second arm bears against the outer surface of the jacket to complete sealing of the auxiliary jack chamber.

This embodiment of the auxiliary jack allows a very compact construction. The arm of the annular piston situated on the side of the shaft of the mechanism thus also forms the piston rod which transmits the piston movement to the punch adapter via the lower part of the bush.

According to another feature of the invention, the compression spring acting in the lifting direction on the bushing is housed in an annular volume defined by the outer jacket of the auxiliary jack and the outer bushing forming the extension of the cylindrical wall of the main jack, and the bushing comprises a collar to co-operate with the spring.

By means of this collar, the spring can be disposed outside the auxiliary jack in the volume thus available. This collar does not obstruct the movement of the piston of the auxiliary jack since the collar abuts the top part of the device and the bushing movement is the first movement carried out during the mechanism operating cycle. This arrangement of the spring and of the collar transmitting the spring force to the bushing thus enables the auxiliary jack to be fitted in this intermediate annular volume. Thus despite the relatively small vertical section of the jack, since it is an annular jack it can develop the forces required to control the movement of the punch during the second phase of movement of the parts according to the invention.

According to another feature of the invention, the bottom part of the bushing has at its bottom edge a collar to co-operate with the heel of the punch adapter so as to be adapted to be pulled into the withdrawal position by the punch adapter when the main jack is controlled in the withdrawal direction (supply to the second chamber).

This characteristic has the advantage of allowing very simple transmission of the auxiliary jack movement. By means of this connection via a heel and a collar, there is a unidirectional link for each part enabling the bottom part of the bushing to be used as a peripheral transmission means acting on the adapter heel. This means thus transmits the movement very regularly, because it is peripheral. Also, this part can thus be made with a reduced thickness, giving greater compactness for the entire mechanism. Since, in addition, the link is established in only one direction for each part, i.e. the auxiliary piston can pull only upwards and the bottom part of the bushing only downwards, when either of the two parts acts it permits the retraction movement of the bottom part of the bushing limiting the space for the lift of the movable end as described hereinafter.

According to another feature of the invention, the auxiliary piston bears a stroke adjustment member which limits the operative stroke of the auxiliary piston driving the movable assembly comprising the main piston, piston rod, punch adapter and punch.

This adapter element which is in the top part of the mechanism is therefore very easily accessible. It may be replaced by an adapter element of different lengths without the need to dismantle the entire mechanism. The mechanism can thus be converted to adapt it to different intermediate travels which, as stated above, range in practice from zero to 27 mm.

According to another feature of the invention, the movable end is an annular member disposed slidably in the main jack cylinder and fitted on the rod of the auxiliary piston, and on a bushing coaxial with the main jack and defining on the movable end an operative section smaller than the actual section of the end.

Making this movable end in two parts provides a very simple and compact solution to the problem of subdividing the movable end into two parts of different sections so that the movable end has one surface (or operative section) smaller than that of the piston so as to allow the jack to operate. As will be explained hereinafter, the difference between the forces exerted on the main piston and on the operative surface of the movable end, less the counteracting force developed by the spring tending to lift the bushing, must give a downwardly extending resultant strong enough to be able to return the movable assembly formed by the main piston, its rod, its adapter, and the punch, to the bottom position, i.e. the inoperative position, at the end of a working cycle.

More particularly, the movable end is formed in two parts defining between them a gap adapted to receive the bushing, the part of the movable end sliding, on the one hand, on the piston rod and, on the other hand, on the corresponding surface of the bushing defining the second chamber of the main jack, while the other part fixed to the previous part guides the movable end on the inner surface of the cylinder of the main jack and on the other surface of the jacket, said part being provided with a communicating duct.

This embodiment of the movable end is particularly advantageous in practice since it allows complex machining problems to be solved. By making the movable end in two parts which are joined on the jacket which in fact forms the reduced-section extension of the main jack cylinder, the construction and installation of the guide and sealing means are facilitated. Consequently, it is very advantageous to use this embodiment of the movable end in two concentric parts to lock the movable end in respect to rotation. To this end, the movable end has at least one guide lug co-operating with a groove formed in the inner surface of the cylinder of the main jack to lock the movable end in respect of rotation while permitting its free displacement.

In practice, advantageously, the movable end has at least two guide lugs to provide symmetrical guidance. If necessary, the number of guide lugs can be increased.

According to another feature of the invention, the main jack piston comprises a stop lug biased by a spring and adapted to engage a corresponding recess of the movable end to allow the main piston to be locked in respect of rotation relative to the mechanism, by means of the movable end, to allow a member to be screwed or unscrewed from the piston rod.

Locking the main piston in respect of rotation is an important element in installing the adapter, punch and cooling tube, these being elements which must be replaced according to the products required. Locking the piston in respect of rotation becomes operative only if the attempt is made to turn the main piston when it is in the top position.

The locking in respect of rotation does not come into, or is not required to come into, operation during normal working of the mechanism, since the stop lug retracts in the direction of movement of the piston.

Similar devices are provided on the plate forming the end of the mechanism to allow the end of travel of the main piston to be damped.

An apparatus according to the invention is illustrated by way of example without limiting force in the accompanying drawings wherein:

FIG. 2 is a partial section of the mechanism of a double-paraison station 4, i.e. a station having two identical twin mechanisms which are symmetrical with respect to the central axis of the Figure, and only one of which will be described.

Figure 1:
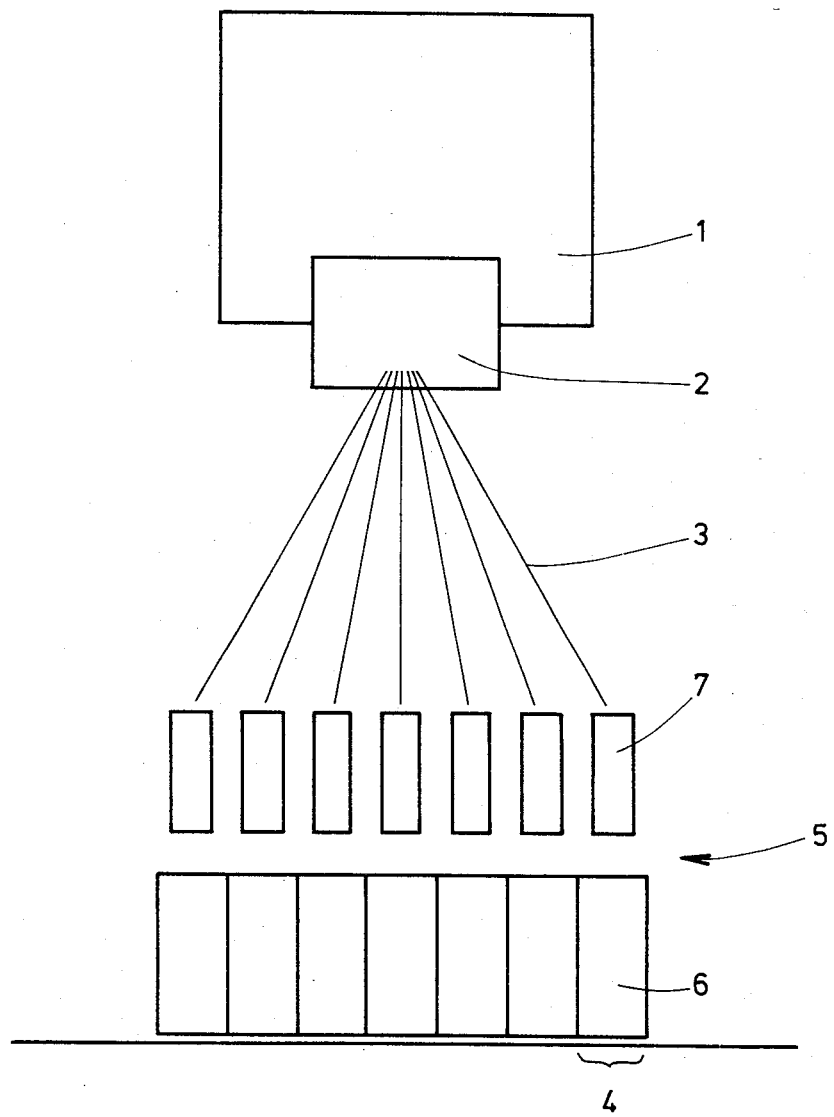
FIG. 1 is a general diagram of the installation.

The mechanism consists of a plate 10 forming the bottom end for the location of two mechanisms. Each location comprises a central hollow shaft 11 which is used both to guide the piston and supply the fluid coolant.

At the bottom, the shaft 11 terminates in a T 12, which is secured in a recess 13 in the plate 10 by a cover plate 14 connected to the plate 10 by screws 15. The coolant fluid is supplied via lateral connections and bores not shown. Sealing is provided by gaskets 16. Plate 10 is also provided with a conventional support 17 for the discharge of the coolant fluid which, for example, is air. Support 17 enables the mechanism to be secured and adjusted in respect of height.

Figure 2:
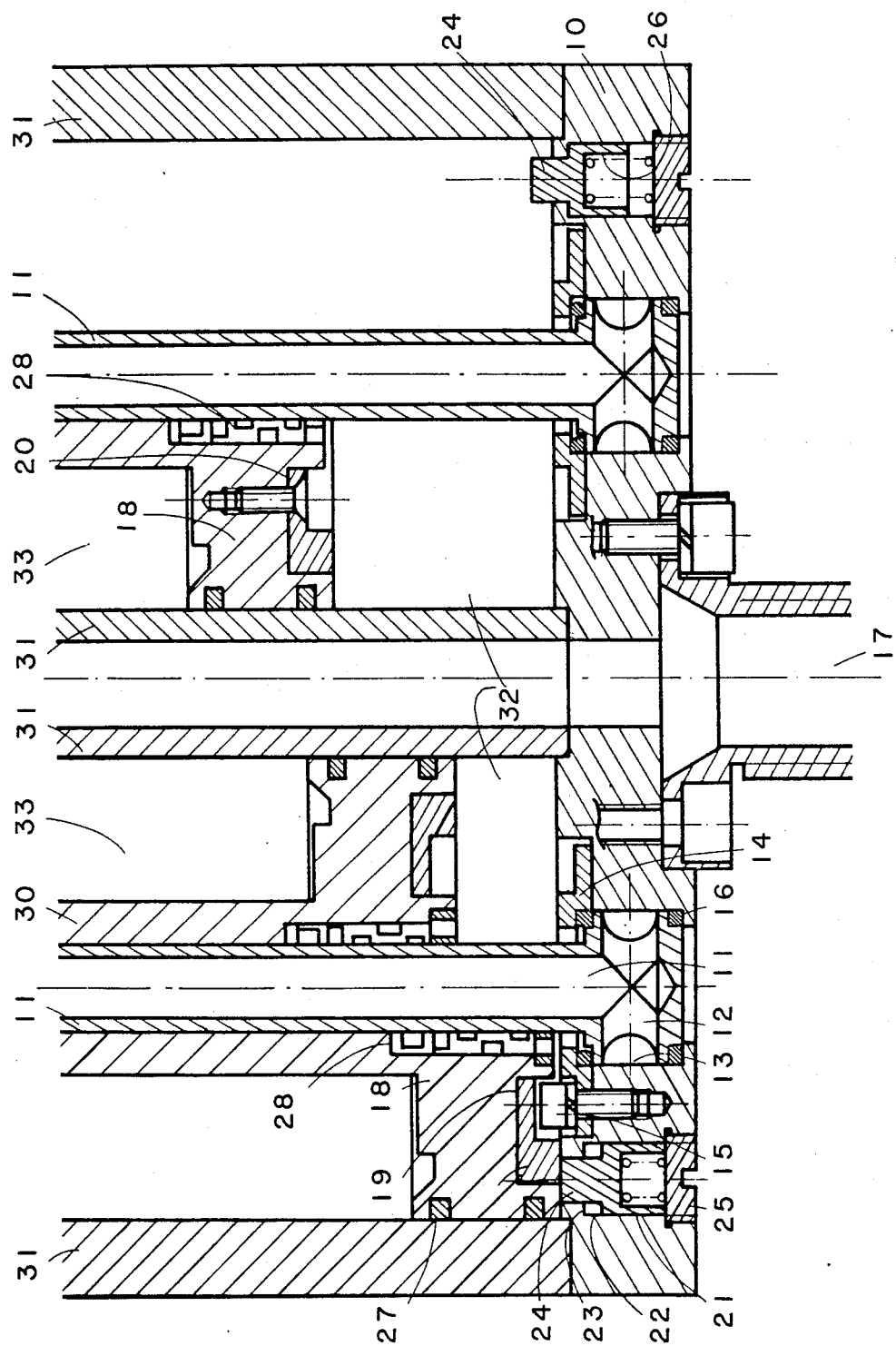
FIG. 2 shows the bottom part of a mechanism in vertical section.

Referring to FIG. 2, connection 17 communicates with the gap between the two twin mechanisms and is equivalent to the fluid coolant outlet.

Figure 3:
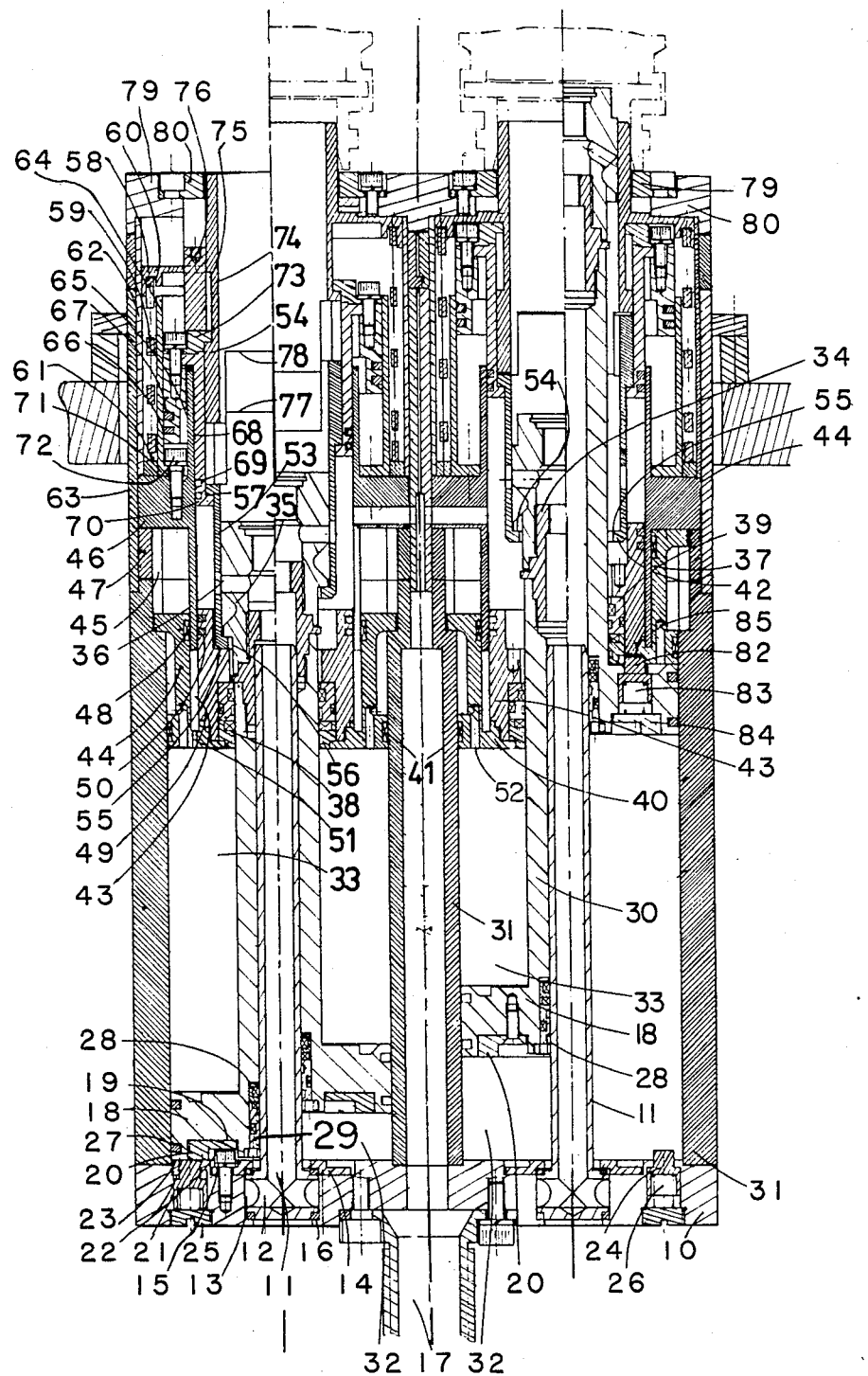
FIG. 3 is a vertical half-section of a mechanism showing the waiting position at the start of the cycle (in section 3A), the position of the parts after the first movement phase during a cycle (in section 3B), the position of the parts after the second movement phase during a cycle (in section 3C), the position of the parts after the third phase of movement during a cycle (in section 3D).

FIG. 2, which corresponds to the half-sections in FIG. 3, shows three different positions of the piston 18.

On the left in FIG. 2, piston 18 is applied against the end 10. The bottom surface of piston 18 is formed with a peripheral groove 19 corresponding to the heads of the screws 15, which project. Groove 19 receives a packing 20 enabling the piston 18 to abut the end 10 irrespective of its angular position with respect to said end.

FIG. 2 also shows a stud 21 disposed in a recess 22 in end 10. Recess 22 has two sections defining a shoulder 23 and the stud 21 has a corresponding shape with a head 24 which can project with respect to the top surface of the plate 10. Stud 21 is introduced into its recess 22 via the bottom surface of the plate and is locked therein by a screw 25 with the interposition of a compression spring 26. These various studs 21 are intended to allow damping of the end of the stroke of the piston 18. The piston 18 also has sliding and sealing segments 27 on its outer surface. The same applies to the inner surface of the piston 18, which has a circular recess 28 receiving guide and sealing segments 29 mounted in rings and co-operating with the outer surface of the hollow shaft 11. Piston 18 is connected to a hollow rod 30 fitted on the shaft 11. The main jack or actuator of the mechanism comprises a cylinder 31 concentric with the shaft 11 and with the piston 18; the latter subdivides the cylinder into a bottom chamber 32 which is also defined by the plate 10, and a top chamber 33 defined by means shown in FIG. 3. Cylinder 31 is disposed on a shoulder of plate 10 and clamping is provided by tie-rods connecting the various parts of the mechanism. These means are not shown.

FIG. 3, section 3A shows the various elements of the mechanism in the initial or inoperative position. Referring to this section 3A, the top part of the piston rod 30 bears a hollow connecting member 34 receiving the punch adapter 35. The latter, which is also hollow, receives the punch (not shown). The punch is generally in the form of a hollow member, the external shape of which corresponds to the glass blank required. Adapter 35 is formed with an orifice 36 for the passage of the fluid coolant flowing in the punch. A movable end 37 is provided between the rod 30 and the cylinder 31 and is adapted to slide on the inner surface of cylinder 31 and on the outer surface of rod 30 so as to close the chamber 33 in the conditions described hereinafter. To this end, the movable end 37 has guide and sealing segments 38 mounted in rings disposed in a recess 39 and held by a member 40 which in turn is provided with a guide ring 41 cooperating with the cylinder 31. Movable end 37 also has an inner groove 42, the function of which will be apparent hereinafter, and a groove 43 defined by the members 37 and 40 and adapted to receive the bottom part of a jacket.

At the top part, the movable end 37 is provided with one or more projecting guide lugs 44 which engage in a groove 45 formed in the inner surface of the cylinder 31 to lock the movable end 37 in respect of rotation. Above the cylinder 31 of the main jack there is provided a jacket, the peripheral heel 46 of which bears on the cylinder 31 through the agency of a ring 47. The bottom part 48 of this jacket provides guidance and sealing in co-operation with the groove 43 in the movable end 37, since the inner part 49 of the movable end 37 is provided with gaskets 50 bearing on the inner surface of the jacket part 48; sealing in the chamber 33 is also provided by contact of the end 37 (member 40) and rod 30.

To prevent the formation of an air cushion, groove 43 is connected to chamber 33 via a bore 51; for a similar reason a passage 52 is provided between the part of the chamber 33 beneath the movable end and the part above the level of the groove 45. Above the movable end there is provided a movable bushing consisting of two parts 53, 54, having the same axis and the same section, which corresponds to that of the adapter 35. The bottom part 53 ends in an inner collar 55 adapted to co-operate with the edge 56 of the adapter by engaging therewith.

Part 53 can pull the adapter 35 upwards and adapter 35 can pull part 53 downwards via this connection of the elements 55, 56.

The top edge of the part 53 ends in an outwardly extending rim 57 adapted to engage the piston of the auxiliary jack.

Above the part 53 is the top part 54, the top end of which centers the ring mould. Top part 54 comprises a collar 58 to co-operate with a compression spring 59 acting to lift the part 54. Spring 59 is preferably a rectangular-section helical spring bearing, on the one hand, in a peripheral groove 60 in collar 58 and, on the other hand, on the heel 46 through a wedge 61.

Spring 59 is disposed in a recess defined by a jacket 62 placed in an outer bushing 63 in extension of cylinder 31. The recess is internally defined by a jacket 64 serving to guide the auxiliary piston. The auxiliary jack comprises an annular chamber concentric with the axis of the mechanism and internally defined by the top part 65 of the jacket (46, 58) and externally by the jacket 64.

The auxiliary jack piston is an annular inverted U-section piston straddling the top part 65 of the jacket, of which an arm (or crown) 66 is provided with sealing rings 67 sliding on the jacket 64, on the inside, and the other arm 68 of which, provided with sealing rings 69, bears internally (i.e. outside the jack) on the top part 65. This arm or crown 68 terminates in the shoulder 70 co-operating with the shoulder 57 of the bottom part 35 of the bushing.

It should be noted that the base of the jacket 64 has a shoulder 71 by means of which it is secured on heel 46 by screws 72.

The top part of the piston is provided with a collar 73 formed, for example, by two halves secured by screws 74 on the piston. Wedges 76 of different heights engage, if required, in two peripheral grooves 75 of the top part 54 so as to allow relative movement between the auxiliary piston (66, 68, 73) and the top part 54 over a length corresponding to the height of said wedge 76. Said wedges 76 can be fitted by removing the wear plate 80.

To facilitate the relative movement of the parts 53, 54, their facing edges 77, 78 have an overlapping crenellation shape, which connect the two parts 53, 54 in respect of rotation while allowing their telescopic displacement. The top of the mechanism is closed by a cap 79 bearing the wear plate 80 at the place where the ring mould is in contact around the exit orifice of the part 54 and of the punch.

The means for supplying the driving fluid (compressed air) for the main and auxiliary jacks are not shown in the drawings. The main jack is a double-acting jack with two separate supplies, one per chamber, while the auxiliary jack is a single-acting jack, the return movement of which is provided by the return movement of the main jack.

Depending upon the jack movements, the chambers which are not operative are connected to the driving fluid return or connected to atmosphere.

In the description of the structure of the mechanism hereinbefore, reference has been made to directions such as top, bottom, upper, lower, etc. This is simply the most conventional arrangement and it is possible to reverse some of the components or their movement within the scope of the invention. The same applies to the decription of the operation given hereinbelow:

DESCRIPTION OF OPERATION

This description will be given by reference to FIG. 3, sections 3A, 3B, 3C, 3D. Sec. 3A shows the initial position of the parts; sec. 3B is a first position after a first movement of some of the components; sec. 3C is a second position after a second movement of some of the components, and finally sec. 3D shows the "pressing" position.

(1) Waiting position (sec. 3A)

The blank pressed during the preceding operation has been conveyed with the ring mould into a finishing mould and the parts of the blanking mould are in the inoperative position; the centering bushing 54 is retracted below the top surface of the mechanism.

In greater detail:

Piston 18 is applied against the end of the plate 10 by the compressed air fed to the chamber 33 at the end of the previous cycle. The piston rod 30 and the adapter 35 carrying the punch are in the bottom position. In this position, the edge 56 of adapter 35 retains the collar 55 of the bottom part 53, the upper rim 57 of which pulls on the shoulder 70 of the auxiliary piston. The collar 73 of the auxiliary piston pulls on the top part 54 and compresses the spring 59. The bushing is thus in the bottom position, in extension, since the parts 53 and 54 are in the farthest apart position.

Movable end 37 is in contact in the bottom position; this position is defined by piston 18 engaging plate 10.

Note that piston 18 is subjected to the resultant of the forces exerted by the pressure in the chamber 33, on the one hand on the piston, and on the other hand, on just a fraction of the surface of the movable end 37. The auxiliary piston 66, 68 is subjected to the action of the top part 54 and is in the bottom position, the auxiliary jack chamber defined by said piston having been connected to atmosphere to allow the discharge of the air and free descent of the auxiliary piston.

(2) Centering of the ring mould (sec. 3B)

Starting from the waiting position described above, the working cycle starts in a first phase by release of the main piston 18, i.e., the chamber 33 of the main jack is connected to atmosphere. In response to the spring 59 acting in the lifting direction on the top part 54, the latter lifts and projects with respect to the top surface of the mechanism in the ring mould which has been fitted; the outer edge of this top part 54 being chamfered. This facilitates its introduction into the ring mould. At the end of the movement this top part 54 is in contact with the bottom surface of the cap 79. The bottom edge of the groove 75 pulls collar 73 and the auxiliary piston 66, 68 upwards; the connection between the shoulder 70 and the rim 57 and between the collar 55 and rim 56 of the adapter 35 causes a slight lift of the assembly comprising the piston 18, rod 30, adapter 35 and punch (not shown). At the end of the movement, the various components occupy the following positions:

(a) Piston 18 is slightly lifted; there is no pressure in chambers 32 and 33.

(b) The movable end 37 has not been pulled by any of the parts and remains free in its given position.

(c) Bushing 53, 54 is in the top position and extended.

(d) The auxiliary piston 66, 68, 73 is in an intermediate lift position; the auxiliary jack chamber has not received any drive fluid.

(3) Filling of mould (sec. 3C)

After the fitting of the ring mould and of the blanking mould, the top part (lid) of the blanking mould is open during the preceding stage, a given quantity of glass falls into the mould, which is then closed by the lid being shut. Before the glass descends into the blanking mould, the mechanism described above has caused the punch to lift, by supplying the auxiliary jack to lift the auxiliary piston. The auxiliary piston stroke is limited by the spacer 76, which abuts the bottom of the wear plate 80. The shoulder 70 of the auxiliary piston drives the rim 57 and thus the bottom part 53, the collar of which engages the heel 56 and lifts the adapter 35, and hence the punch. The punch is thus positioned and ready to enter the glass.

During this movement the movable end 37 does not come into operation.

At the end of this second phase, the parts occupy the following positions:

(a) Piston 18 is in an intermediate lifting postion; there is no pressure in the chambers 32, 33.

(b) The movable end is still in an indeterminate position.

(c) The bottom part 53 of the bushing 53, 54 is in the top position and the two parts 53, 54 are contiguous.

(d) The auxiliary piston is in contact in the top position or against the spacers 76.

(4) Pressing the blank (sec. 3D)

Driving fluid (compressed air) is introduced into the chamber 32 of the main jack, the piston 18 of which lifts. It lifts the punch which presses the blank in the blanking mould. To ensure adequate punch travel, piston 18 lifts the movable end 37, which then comes into the retracted top position.

At the end of this third phase, the parts occupy the following positions:
 (a) Piston 18 is in the top end-of-travel position.
 (b) Movable end 37 is in the retracted top position.
 (c) Bushing 53, 54 is in the top compressed position.
 (d) Auxiliary piston 66, 68, 73 is in the top end-of-travel position or abutting the spacers 76.

(5) Return movement at the end of the cycle (sec. 3A)

After the pressing phase, the main jack is driven to return the parts to the initial position. To this end, the drive fluid is fed to the chambers 33 so that piston 18, rod 30, adapter 35 and the punch descend.

The heel 56 of the adapter 35 pulls the bottom part 53 downwards; the latter drives the auxiliary piston 66, 68, of which the half 73 drives the top part 54, which compresses the spring 59.

When the collar 55 meets the movable end 37, it drives the latter since the downgoing force acting on the assembly comprising the piston 18, rod 30, adapter 35, punch, auxiliary piston, 66, 68, 73, and bushing 53, 54, is the resultant of the counteracting forces exerted by the driving fluid on the piston 18 and the operative part of the movable end 37, said resultant being reduced by the counteracting force exerted by the spring 59.

At the end of this return movement, the parts occupy the "waiting" position already described above.

Section 3D also shows the main piston 18 locked on the movable end 37 by retractable lug 82 subject to the action of a spring 83 and held in its recess by a screw plug 84. The head of the lug engages in a recess 85 formed in the movable end 37.

When the mechanism operates, the main piston 18 is not oriented at an angle with respect to the movable end 37, so that the head of the lug 82 is not necessarily opposite the recess 85; the lug then retracts and compresses the spring 83. On the other hand, to unscrew the punch adapter, the piston 18 is rotated in the top position until lug 82 engages in the recess 85, thus preventing rotation of the piston 18 and allowing unscrewing and screwing.

If cores are used, which require a small-amplitude travel, a spacer (not shown) is disposed inside the bushing 53, 54 before the punch spacer 35 is screwed.

The height of this adapter is calculated according to the difference between the maximum permitted travel and the required travel, so as to utilize the adjustment possibilities of the waiting position of the core before pressing as described in section 3D.

I claim:

1. Apparatus for the production of bottle and flask type glass containers being adapted for use in equipment utilizing either the blow-blow or press-blow process, the equipment having blanking and finishing moulds including ring moulds and with single or multiple-paraison modular boxes, the punch control mechanisms being disposed beneath the blanking moulds, each apparatus having at least one double-acting main jack including a piston and rod and a punch adapter at the terminal end of the rod, the piston of said main jack controlling the pressing movement of the punch, a cooling circuit having fluid which flows through the apparatus and punch, a drive fluid supply to operate the main jack, the apparatus comprising:
 a two-part bushing having a top part and a bottom part, the top part being adapted to project from the apparatus to an exit position in which said top part enters into the ring mould and centers the ring mould, the bottom part being engageable with the top part;
 a compression spring acting on the top part to being the top part into the exit position;
 an auxiliary jack adapted for lifting the main jack by an adjustable length;
 link means for operatively connecting the auxiliary jack to the piston of the main jack; and
 a movable end (37) defining with the piston a first chamber of the main jack, the movable end having an operative section smaller than that of the piston, the movable end being fitted on the rod beneath the bottom part and being movable between a bottom position thereby allowing the withdrawal of the punch adapter and the top part to beneath the surface of the apparatus and a top position allowing the upward movement of the piston and of the punch to carry out the pressing stroke.

2. Apparatus according to claim 1, characterised in that the link means includes a link between the top and bottom parts (53, 54) of the bushing being provided by the auxiliary jack (66, 68, 73) whereby said link allows the top and bottom parts (53, 54) to extend and allows the bottom part (53) and the top part (54) to engage.

3. Apparatus according to claim 2, characterised in that the top and bottom parts (53, 54) of the bushing have crenellated edges (77, 78) for engaging one another and connecting the top and bottom parts of the bushing during rotation.

4. Apparatus according to claim 1, characterised in that the auxiliary jack includes an inner jacket (65) and an outer jacket (64) connected (71, 72) to one another to define an annular auxiliary jack chamber and an inverted U-section piston straddling the inner jacket (65), said U-section piston having a first arm and a second arm, the first arm (67) closing the auxiliary jack chamber with respect to the inner and outer jackets (65, 64) and the second arm (68) bearing against the outer surface of the inner jacket (65) to completely seal the auxiliary jack chamber.

5. Apparatus according to claim 4, characterised in that the auxiliary jack (66, 68) further includes a collar (73) in the form of a half-shell engaging a longitudinal groove (75) in the top part (54) of the bushing and a rim (70) engaging beneath a top collar (57) of the bottom part (53) at the bottom end of the second arm.

6. Apparatus according to claim 5 characterised in that the compression spring (59) acting in the lifting direction on the top part is housed in an annular volume defined by the outer jacket (64) of the auxiliary jack and an outer bushing (63) forming an extension of a cylindrical wall (31) of the main jack, and the bushing (53, 54) includes a collar (60) to co-operate with the spring (59).

7. Apparatus according to claim 1, characterised in that the bottom part (53) of the bushing (53, 54) has, at its bottom edge, a collar (55) to co-operate with a heel (56) of the punch adapter (35), so as to be adapted to be pulled into the withdrawl position by the punch adapter (35) when the main jack (18, 32, 33) is moved in the withdrawal direction (supply to the second chamber (33)).

8. Apparatus according to claim 1, characterised in that the auxiliary piston (66, 68) includes a stroke adjustment member (76) which limits the operative stroke of the auxiliary piston driving the movable assembly comprising the main piston (18), piston rod (30), punch adapter (35) and punch.

9. Apparatus according to claim 1, characterised in that the movable end (37) is an annular member disposed slidably in a main jack cylinder (31) and fitted on the rod (30) of the main jack, and on a jacket (48) coaxial with the main jack and defining on the movable end an operative section smaller than the actual section of the end.

10. Apparatus according to claim 9, characterised in that the movable end (37) is formed in two parts (49, 40) defining between them a gap (43) adapted to receive the jacket (48), the part (49) of the movable end (37) sliding on the corresponding surface of the jacket (48) defining the second chamber (33) of the main jack, while the other part (40) fixed to the previous part guides the movable end on the inner surface of the cylinder (31) of the main jack and on the other surface of the jacket (48), said part being provided with a communicating duct (52).

11. Apparatus according to any one of claims 1, 9 and 10, characterised in that the movable end has at least one guide lug (44) co-operating with a groove (45) formed in the inner surface of the cylinder (31) of the main jack to lock the movable end (37) in respect of rotation while permitting its free displacement.

12. Apparatus according to claim 1, characterised in that the main jack piston (18) comprises a stop lug (82) biased by a spring (83) and adapted to engage a corresponding recess (85) of the movable end (37) to allow the main piston (18) to be locked in respect of rotation relative to the mechanism, by means of the movable end (37), and to allow a member to be screwed on or unscrewed from the piston rod (13).

* * * * *